L. J. MONAHAN.
AUTOMOBILE POWER PLANT.
APPLICATION FILED MAR. 23, 1912.
1,085,465.
Patented Jan. 27, 1914.
3 SHEETS—SHEET 2.
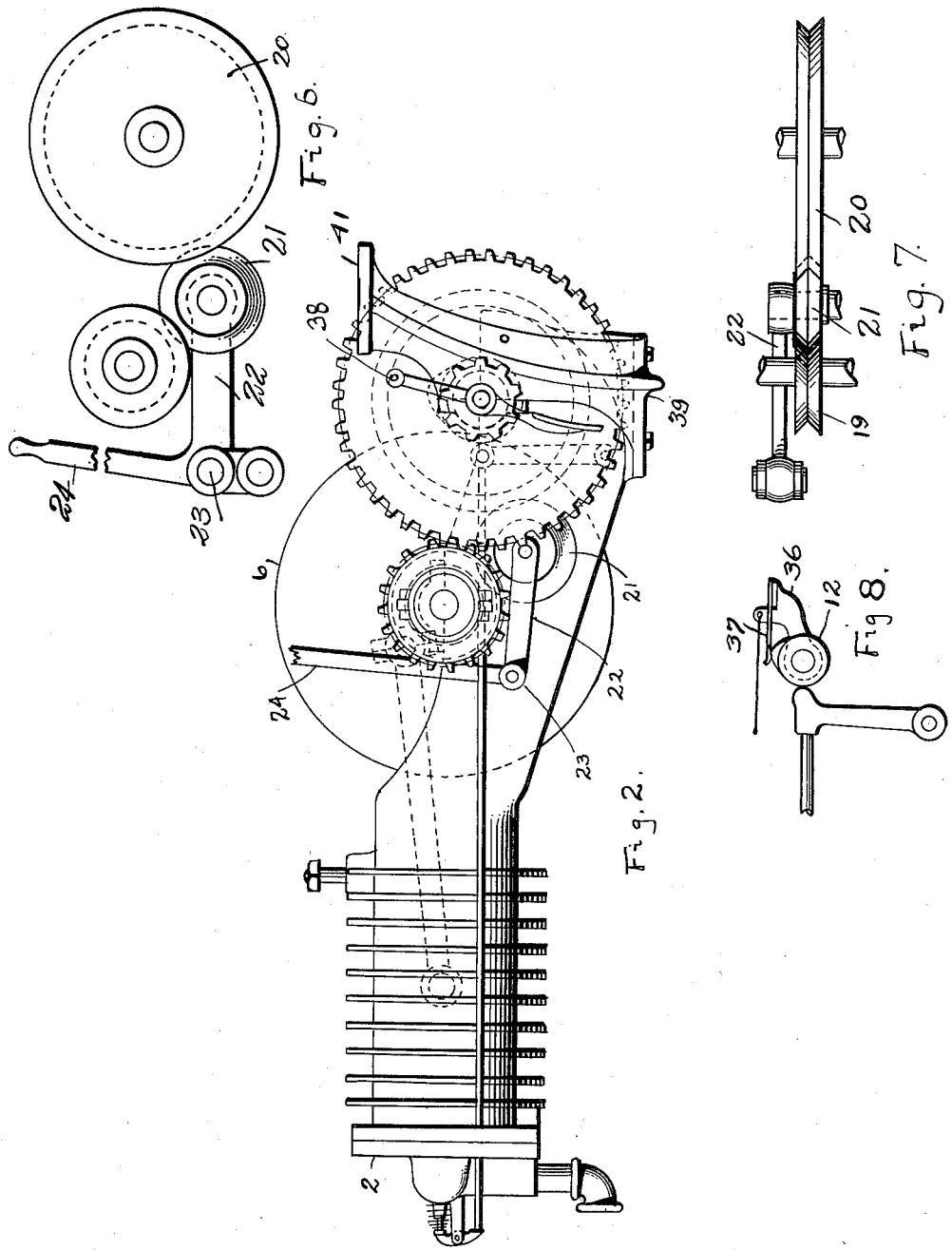

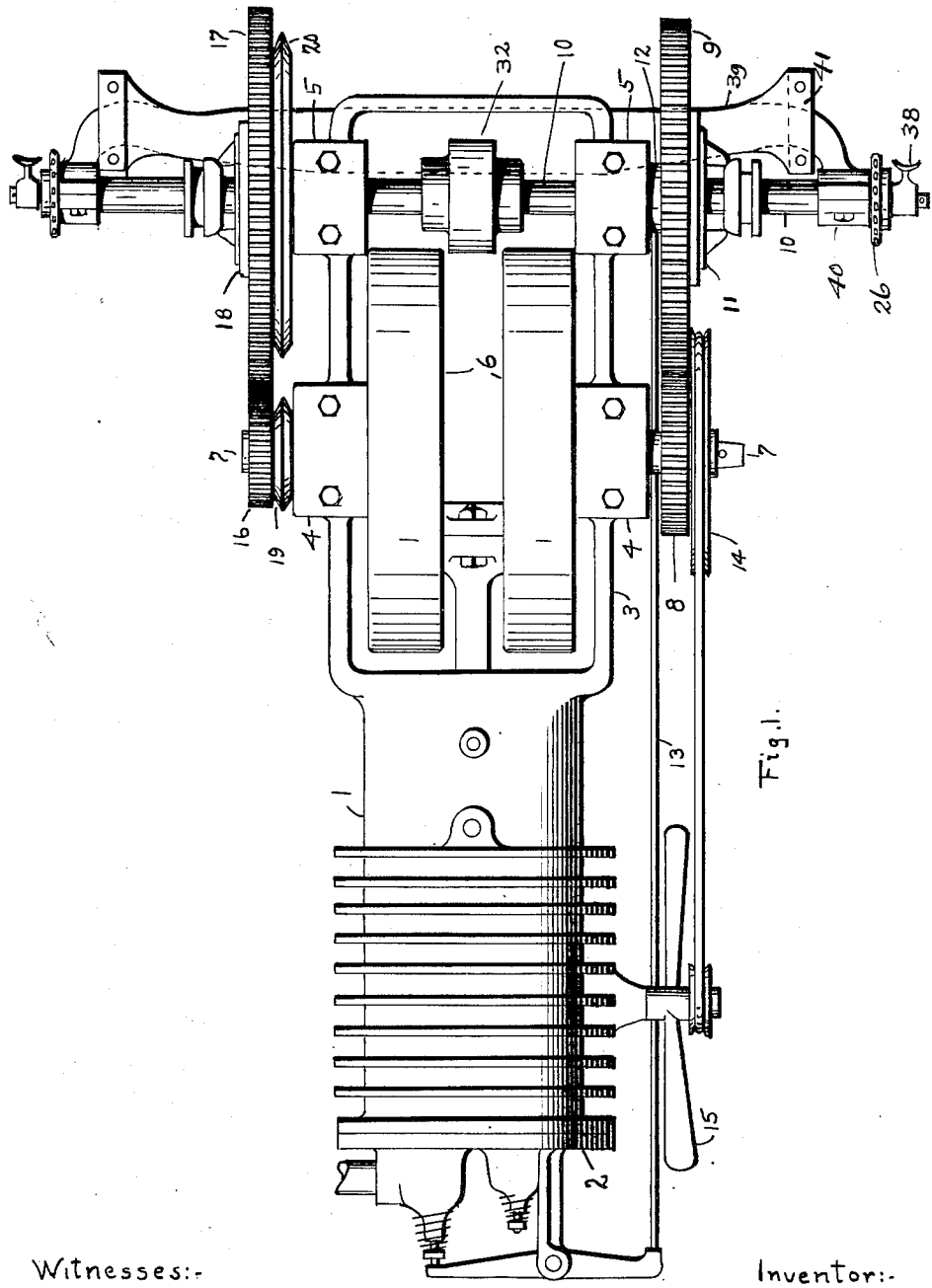

L. J. MONAHAN.
AUTOMOBILE POWER PLANT.
APPLICATION FILED MAR. 23, 1912.
1,085,465.
Patented Jan. 27, 1914.
3 SHEETS—SHEET 3.
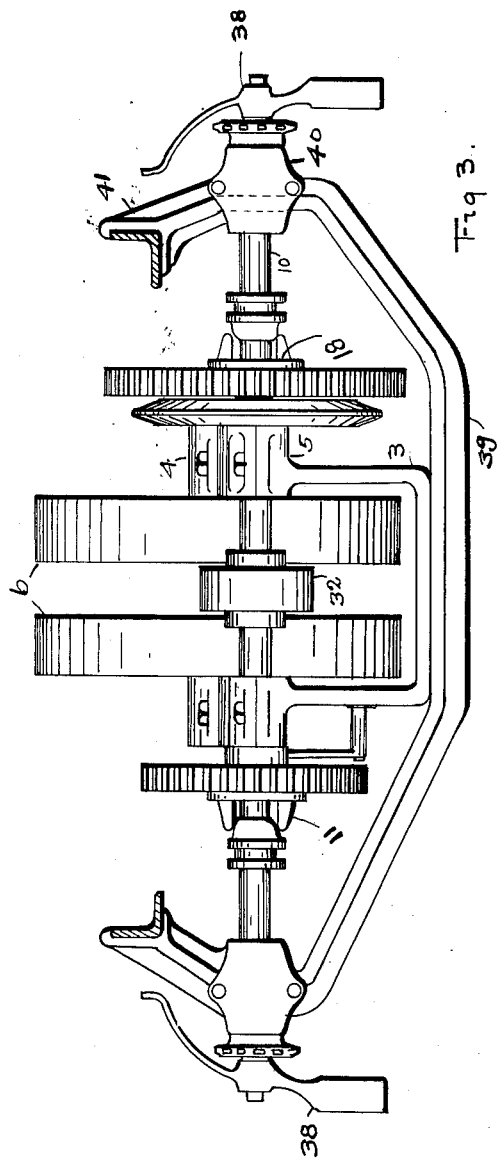
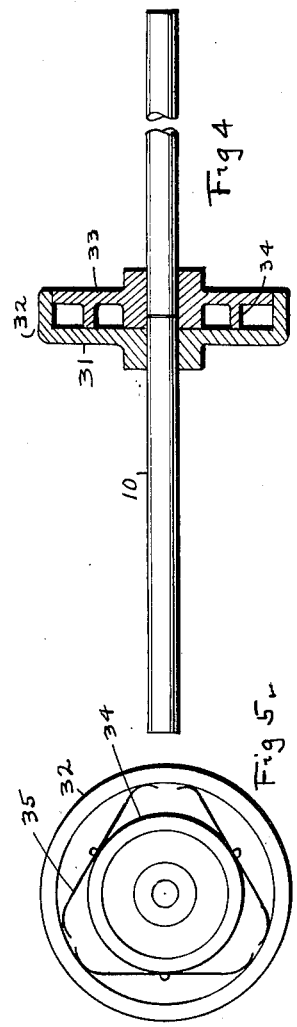
Witnesses:-
Inventor:-
Louis J Monahan

UNITED STATES PATENT OFFICE.

LOUIS J. MONAHAN, OF OSHKOSH, WISCONSIN, ASSIGNOR TO L. G. WADE, OF HOLLY, MICHIGAN.

AUTOMOBILE POWER PLANT.

1,085,465.  Specification of Letters Patent.  Patented Jan. 27, 1914.

Application filed March 23, 1912. Serial No. 685,671.

*To all whom it may concern:*

Be it known that I, LOUIS J. MONAHAN, a citizen of the United States, residing at Oshkosh, in the county of Winnebago and State of Wisconsin, have invented certain new and useful Improvements in Automobile Power Plants, of which the following is a specification.

The invention relates to a new and useful power plant for driving automobiles.

The object of the invention is to provide a simple and effective power plant with the essential mechanical parts arranged in the simplest forms to produce most economically, a complete power plant.

A further object is to arrange the engine and transmission gear in a single casing adapted to be attached to the car frame at three points, and so the entire plant can be removed easily.

In the drawing, Figure (1), is a top view of the complete plant; Fig. (2), a side view; Fig. (3), a front end view; Fig. (4), a detail of the friction coupling of the jack shaft; Fig. (5), an end view of same; Fig. (6), a side view of the friction reverse gear; Fig. (7), a top view of same, and Fig. (8), a side view of an adjustable timer and exhaust cam.

In the drawings Fig. (1), shows a cylinder of a conventional type of an air cooled gasolene engine with a cylinder (1) and cylinder head (2) containing inlet and exhaust valves, however, these valves may be placed on the side of the cylinder if desired. The cylinder may also be water cooled by a slight change.

(3) is a frame forming part of the cylinder or a separate casting and is formed to contain the main crank shaft bearings, (4), and to extend forward with bearings (5) forming part thereof. The cylinder contains a piston and connecting rod of conventional type, but the crank shaft is either of the built-up pattern or has a solid forged crank with fly wheels cast on the crank webs instead of building up with disks and pins; (6) shows the fly wheels or crank disks which have the extending crank shafts (7) at each end and journaled in the bearings (4). A spur gear (8) is secured to the crank shaft; another gear (9) meshing into gear (8) is mounted loosely on a counter shaft (10) which is journaled in the bearings (5); the gear (9) has exactly twice the number of teeth of gear (8) so it is driven at half speed; the crank shaft making two revolutions to one revolution of gear (9), the latter gear is arranged with a friction clutch (11) which may be engaged to drive the counter shaft (10) therefrom, the gear (9) also has a cam (12) forming part thereof, which operates the exhaust valve through the rod (13). The gear (8) has a belt pulley (14) attached thereto or the pulley may be mounted on the engine shaft for driving a suitable fan (15), to effect the cooling of the engine cylinder, unless a water cooled cylinder is used. The other end of the crank shaft has a small pinion (16) rigidly mounted thereon and adapted to mesh into a large gear (17) which is mounted loosely on the countershaft 110) and adapted to engage said countershaft through a friction clutch (18). It will be noted that when the clutch (11) is engaged, the countershaft (10) will be driven at one half the speed of the crank or engine shaft (7) but the gears (16) and (17) are so proportioned that a much lower speed is imparted to the counter shaft (10) by engaging the clutch (18), this giving two available speeds to the countershaft at constant engine shaft speed.

In order to reverse the direction of rotation of the countershaft 10 a tongue and groove friction transmission is provided and composed of a friction wheel 19 secured to shaft 7 and another friction wheel 20 secured to shaft 10 or to the rigid portion of friction clutch 18. Arranged below, but in the same plane with the friction wheels is a bevel faced idler (21) journaled to an oscillating lever (22) which in turn is fulcrumed or pivoted to the engine frame at (23); the lever (22) has an extending arm (24) arranged or brought to a convenient position within easy reach of the operator, or it may be connected to a foot pedal by means of a rod. The lever (24) being pressed to the left causes the bevel faced idler to enter the grooved wheels and revolve but in a reverse direction to the crank or driving shaft, but ordinarily this portion of the gear is not in use.

In car driving, it is necessary to provide compensating means to permit one drive wheel to travel faster than the other when rounding corners. This is provided for in the friction coupling (30) the counter shaft

(10) being separated in the coupling, the coupling is shown in detail in Figs. (4) and (5) the numeral (31) being one of the flanges of the coupling which is secured to one portion of the counter shaft (10) and has the cylindrical periphery or ring (32) extending outward as shown. (33) is another flange secured to the other half of the counter shaft (10) and is fitted inside the cylindrical ring (32) or up against same, and has the projecting concentric ring (34) extending in, near, or against the other part of the coupling (31) leaving a space between the two said rings, the countershaft being separated between the two said flanges, having one end extend beyond its hub and into the other hub a short distance to retain the shaft in alinement. Arranged between the projecting rings (32) and (34) of the coupling are a number of flat steel springs (35) which maintain a constant pressure at all times against the surface so that the driving of one end of the counter shaft will cause the other to revolve therewith unless same is opposed by a load greater than the frictional power of the springs (35).

On the ends of the counter shaft are hung loosely, a pair of brake levers (38) which are actuated by means of a foot pedal through a cable or rods and which are arranged with a shoe to press against the tires.

The timer for making and breaking the contact to produce the spark for igniting the mixture is arranged to be operated from the second gear (9), a bracket (36) being provided and a flat spring (37) attached thereto, but insulated therefrom, the said spring is arranged to rest over the path of travel of the cam (12) so the cam projection will make contact with the spring (37) at the proper point to cause a spark to jump in the cylinder in the usual manner. If desired, a magneto may be attached in place of the timer. The engine frame (3) is hung in an auxiliary frame (39) which has outer counter-shaft bearings (40) attached thereto and upward extending attaching-lugs (41) which are secured to a suitable angle iron frame, for supporting the front end of the power plant.

After the power plant is mounted in the frame by hanging it at three points, one near each bearing (41) and the other on the cylinder or frame, and connecting up the fuel, feed and ignition equipment, the engine is ready to be started, which is accomplished by slipping a crank on the engine crank (7) and turning it around to draw a charge of explosive mixture into the cylinder and compress and ignite it. After the engine is started the vehicle to be driven from the sprockets (26) can be started by moving a lever to cause the high or low speed clutch to engage which will drive the vehicle in the forward direction at either high or low speed depending on which clutch is used. To reverse the direction of the vehicle the friction transmission is used by moving the lever (24) to cause the friction idler (21) to wedge up between the friction wheels (19) and (20) which will cause the counter shaft (10) to revolve in an opposite direction than when one of the friction clutches is used. The friction idler can be operated by a foot lever which may be more convenient in some cases.

It will be seen that only one half of the countershaft (10) is being positively driven at all times, the other half being driven through the friction coupling (30) which allows one wheel to run faster than the other in rounding corners or making short turns thus offering a very economical construction.

What I claim and desire to secure by Letters Patent is:—

1. In an automobile power plant the combination with an explosive engine having an extending frame, a crank shaft journaled therein, a counter shaft journaled in the frame and disposed parallel to the crank shaft and revolubly connected thereto by means of a plurality of sets of gears, each set of gears being capable of rotatable engagement through suitable friction clutches independent of each other, grooved friction wheels arranged to connect the crank shaft and counter shaft and capable of being engaged or disengaged for the purpose of reversing the direction of rotation of the counter shaft and a driving sprocket fitted to each end of the countershaft.

2. In an automobile power plant the combination with an explosive engine having an extending frame, a crank shaft and counter shaft journaled in the frame and connected with each other by means of a plurality of gears, said gears arranged to drive the counter shaft through suitable friction clutches, one of the gears on the counter shaft having a cam for operating the engine valve, friction gears arranged to connect the crank shaft and counter shaft but held normally out of engagement.

3. In an automobile power plant the combination with an explosive engine having an extending frame, a crank shaft and counter shaft journaled in the frame, gears arranged to connect the crank shaft and counter shaft through friction clutches, one of the countershaft gears having a cam attached thereto for operating the engine valve and devices attached to the same gear for operating the engine ignition, friction gears arranged to connect the crank shaft and counter shaft but normally held out of engagement.

4. In an automobile power plant, the combination with an explosive engine having an extending frame, a crank shaft and counter shaft journaled in the frame, a set of gears disposed on each side of the frame and adapted to connect the crank shaft and counter shaft through friction clutches, one of the counter shaft gears having means attached thereto for operating the engine valve and ignition, a friction wheel attached to the crank shaft, another friction wheel attached to the counter shaft, an idler arranged to be forced between the two said wheels for reversing the direction of rotation of the counter shaft.

5. In an automobile power plant, the combination with an explosive engine having an extending frame, a crank shaft and counter shaft journaled in the frame, gear wheels arranged on each side of the frame and adapted to revolubly connect the crank shaft and counter shaft, one of the countershaft gear wheels having devices thereon arranged to operate the engine valve and ignition, friction wheels arranged to connect the crank shaft and counter shaft but normally held out of engagement, sprocket wheels mounted near the ends of the counter shaft and brake shoe devices hung on the ends of the counter shaft.

6. In an automobile power plant, the combination with an explosive engine having an extending frame, a two part counter shaft journaled in the frame parallel to the crank shaft, the said two parts being held together by means of a friction coupling, gear transmission arranged to connect the crank shaft and counter shaft through suitable clutches, and friction wheels arranged to connect the two said shafts but normally held out of engagement.

In testimony whereof I affix my signature, in the presence of two witnesses.

LOUIS J. MONAHAN.

Witnesses:
F. V. McManamy,
Mary Monahan.